(12) United States Patent (10) Patent No.: US 8,452,871 B2
Ge et al. (45) Date of Patent: May 28, 2013

(54) PASSIVE AND COMPREHENSIVE HIERARCHICAL ANOMALY DETECTION SYSTEM AND METHOD

(75) Inventors: Zihui Ge, New Jersey, NJ (US); Ashley Flavel, New York, NY (US); Alexandre Gerber, Madison, NJ (US); Dan Pei, Jersey City, NJ (US); Hiren Shah, Morristown, NJ (US); He Yan, Parsippany, NJ (US); Jennifer Yates, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

(21) Appl. No.: 13/219,635

(22) Filed: Aug. 27, 2011

(65) Prior Publication Data

US 2013/0054783 A1 Feb. 28, 2013

(51) Int. Cl.
 *G06F 15/173* (2006.01)
(52) U.S. Cl.
 USPC .......................................... 709/224; 709/223
(58) Field of Classification Search
 USPC .................................................. 709/223, 224
 See application file for complete search history.

(56) References Cited

PUBLICATIONS

Akamai website; http://www.akamai.com/html/technology/index.html.
Bgpmon project website; http://bgpmon.netsec.colostate.edu/.
Compuware website; http://www.compuware.com/application-performance-management/cdn-selection-and-optimization-solutions.html; pp. 1-2.
Keynote website http://www.keynote.com/solutions/web_performance/website-monitoring-products-services.html; pp. 1-2.
Limelight website; http://www.limelight.com/solutions.
AquaLab Project Website; http://www.aqualab.cs.northwestern.edu/projects/NEWS.html; pp. 1-3.
H. Balakrishnan, M. Stemm, S. Seshan, and R. Katz; Analyzing stability in wide-area network performance; ACM SIGMETRICS Performance Evaluation Review, 25(1):2-12,1997.
P. Barford, J. Kline, D. Plonka, and A. Ron; A signal analysis of network traffic anomalies; In Proceedings of the 2nd ACM SIGCOMM Workshop on Internet measurement, pp. 71-82. ACM, 2002.
J. Brutag; Aberrant behavior detection in time series for network monitoring; In Proceedings of the 14th Systems Administration Conference (LISA 2000).
B. Chandra, M. Dahlin, L. Gao, and A. Nayate; End-to-end WAN service availability; In Proceedings of the 3rd conference on USENIX Symposium on Internet Technologies and Systems-vol. 3, p. 9. USENIX Association, 2001.
N. Feamster, D. Andersen, H. Balakrishnan, and M. Kaashoek; Measuring the effects of internet path faults on reactive routing; In Proceedings of the 2003 ACM SIGMETRICS international conference on Measurement and modeling of computer systems, p. 137. ACM, 2003.
D. Johnson; Approximation algorithms for combinatorial problems*; Journal of Computer and System Sciences,9(3):256-278, 1974.

(Continued)

*Primary Examiner* — Adnan Mirza

(57) ABSTRACT

A technique for monitoring performance in a network uses passively monitored traffic data at the server access routers. The technique aggregates performance metrics into clusters according to a spatial hierarchy in the network, and then aggregates performance metrics within spatial clusters to form time series of temporal bins. Representative values from the temporal bins are then analyzed using an enhanced Holt-Winters exponential smoothing algorithm.

16 Claims, 9 Drawing Sheets

PUBLICATIONS

R. Krishnan, H. Madhyastha, S. Srinivasan, S. Jain, A. Krishnamurthy, T. Anderson, and J. Gao; Moving beyond end-to-end path information to optimize CDN performance; In Proceedings of the 9th ACM SIGCOMM conference on Internet measurement conference, pp. 190-201. ACM, 2009.

J. Padhye, V. Firoiu, D. Towsley, and J. Kurose; Modeling TCP throughput: A simple model and its empirical validation; In Proceedings of the ACM SIGCOMM'98 conference on Applications, technologies, architectures, and protocols for computer communication, p. 314. ACM, 1998.

V. Padmanabhan, L. Qiu, and H. Wang; Server-based inference of Internet performance; in IEEE INFOCOM. Citeseer, 2003.

V. Paxson; End-to-end routing behavior in the Internet; ACM SIGCOMM Computer Communication Review, 36(5):56, 2006.

S. Savage, A. Collins, E. Hoffman, J. Snell, and T. Anderson; The end-to-end effects of Internet path selection; ACM Sigcomm Computer Communication Review, 29(4):289-299, 1999.

H. Yan, R. Oliveira, K. Burnett, D. Matthews, L. Zhang, and D. Massey; BGPmon: A real-time, scalable, extensible monitoring system; In Cybersecurity Applications and Technologies Conference for Homeland Security (CATCH),2009.

M. Zhang, C. Zhang, V. Pai, L. Peterson, and R. Wang; PlanetSeer: Internet path failure monitoring and characterization in wide-area services; In Proc. USENIX OSDI, 2004.

Y. Zhang; Characterizing End-to-End Internet Performance; PhD thesis, Citeseer, 2001.

Y. Zhang, Z. Mao, and M. Zhang; Effective diagnosis of routing disruptions from end systems; In Proceedings of USENIX.

US 8,452,871 B2

PASSIVE AND COMPREHENSIVE HIERARCHICAL ANOMALY DETECTION SYSTEM AND METHOD

FIELD OF THE DISCLOSURE

The present disclosure relates generally to network performance monitoring, and more particularly, to the passive detection of anomalies in an Internet Service Provider (ISP) system in order to identify and describe events affecting quality of service (QoS) perceived by users of the system.

BACKGROUND

Internet Service Providers are rolling out a wide range of value added services beyond basic connectivity, such as web hosting, content distribution network (CDN) service, database, gaming, cloud computing and e-commerce server hosting. These services have vast numbers of customers from throughout the Internet. They are typically hosted in geographically distributed data-centers that are often co-located with ISPs' Point of Presence (PoPs) and managed by the same ISPs. Detecting and localizing end-to-end performance issues in these wide area services is critical for ISP operators to improve the service quality perceived at wide-area end users, for example, through fast service impairment detection and flexible mitigation control.

Currently-used service performance monitoring approaches use large numbers of active probing devices strategically placed in the network. That approach has several disadvantages. First, the services may cover a vast number of users from diverse locations. Without active probes from a vast number of network locations throughout the Internet, the monitoring coverage is limited and some performance issues will not be detected. Second, even when performance issues are identified, the localization of the performance issues is limited by the number, source location and frequency of the probes. Finally, a significant number of probe packets place additional overhead on the network and may be treated differently than normal packets.

SUMMARY OF THE DISCLOSURE

In accordance with a first aspect of the disclosure, a method is disclosed for detecting an anomaly event in a computer network. A plurality of series performance metrics are determined by a computer. Each one of the series performance metrics represents a time series of performance measurements of connections made to one of the plurality of clients.

The series performance metrics are spatially aggregated by the computer according to a spatial hierarchy, to create a plurality of spatial clusters. In each spatial cluster of the plurality of spatial clusters, series performance metrics are temporally aggregating by the computer to form a time series of temporal bins.

For each temporal bin of the time series of temporal bins, an actual temporal bin metric representative of time series performance metrics in the temporal bin is determined by the computer. Then for each temporal bin of the time series of temporal bins: (1) a forecast temporal bin metric is determined by the computer from actual temporal bin metrics determined for temporal bins preceding the temporal bin; and (2) an actual temporal bin metric of the temporal bin is compared by the computer with the forecast temporal bin metric to detect the anomaly event.

These aspects of the disclosure and further advantages thereof will become apparent to those skilled in the art as the present disclosure is described with particular reference to the accompanying drawings.

DETAILED DESCRIPTION

Figure 1:
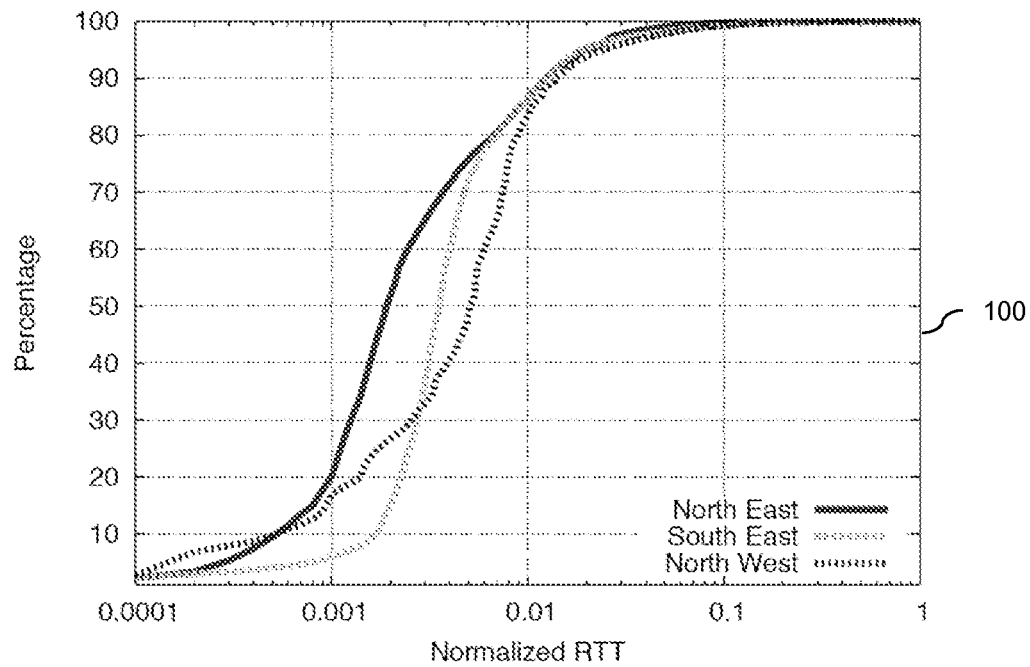
FIG. 1 is a chart showing distribution of normalized RTT across client RTT series in three example datasets.

The disclosed methods and systems may be used in the detection and isolation of performance issues in ISP-hosted wide-area services. In contrast to widely-used service performance monitoring approaches in which a larger number of active probing devices must be strategically placed in the network, the presently disclosed technique focuses on only a few monitoring points where traffic from all users is aggregated. The technique extracts various performance metrics from passively monitored traffic and detects issues at different locations comprising a relatively large collection of users. The locations are in a spatial hierarchy that is constructed with various information such as network topology, geo-location information and routing information.

In the following disclosure, an in-depth analysis and characterization is presented of the TCP round trip latency dynamics observed from the client requests in a CDN service managed by a tier-1 ISP. Based on those observations, a passive hierarchical anomaly detection and isolation system is designed and deployed in the ISP for service management operators. The inventors have found that the passive hierarchical anomaly detection and isolation system is very effective in accurately and quickly pinpointing important service problems, which could be easily missed by active probing approaches.

Embodiments of the disclosure will be described with reference to the accompanying drawing figures wherein like numbers represent like elements throughout. Before embodiments of the disclosure are explained in detail, it is to be understood that the disclosure is not to be limited in its application to the details of the examples set forth in the following description and/or illustrated in the figures. The disclosure is capable of other embodiments and of being practiced or carried out in a variety of applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As described in greater detail below, the presently disclosed methods and systems adopt a multistage approach as follows:

PRE-PROCESSING: If multiple performance measurements from the same user are observed within one second, only one representative measurement is taken. Different statistics can be used as the representative measurement, such as a minimum, a maximum, an average, a median or another percentile value as suits a particular case. This stage is needed in order to filter out local variance for more effective spatial and temporal aggregation later.

SPATIAL AGGREGATION: Per-user performance metrics are grouped into different spatial clusters according to the spatial hierarchy. Various spatial clusters provide critical insights regarding the locations of the anomalies detected later.

TEMPORAL AGGREGATION: Per-user performance metrics are organized in each spatial cluster into bins. Binning is a classic data processing technique for data smoothing, which is much needed to deal with the high variability inside clusters. Two types of binning methods are used: fixed size bin and fixed time bin.

CONSTRUCTING TIME SERIES: After the previous three stages, a representative value from each bin is picked to form a time series. Several statistics can be used as the representative value: minimum, maximum, average, median or other percentile values. Different statistics may have advantage for tracking certain type of issues.

ANOMALY DETECTION: To detect anomalies from the time series at different locations, a new enhanced Holt-Winters algorithm is adopted, which is specially designed for real-time online anomaly detection of network performance issues. Compared to the traditional Holt-Winters algorithm, the enhanced Holt-Winters algorithm has the following features:

In order to deal with the distribution changes in network performance data, the enhanced Holt-Winters algorithm keeps two copies of the model parameters: a working copy and a shadow copy. Each copy is updated in parallel using different strategies. The working copy gives more weight to the history compared to the recent observations and also ignores anomalies for updating itself, which are desirable for anomaly detection when the underlying distribution is stable. The shadow copy gives more weight to the recent observations, so that when the distribution changes, as is quite common in network performance data, it can quickly adapt to the new distribution. Once the number of recent or consecutive abnormal observations exceeds some threshold, suggesting that the underlying distribution has changed, the enhanced algorithm copies the shadow copy over the working copy, as the shadow copy should have adapted to the new underlying distribution.

In cases where the network performance data is especially noisy, the technique of using a shadow copy alone is less effective due to the lack of a stable distribution. In order to suppress the excessive number of anomalies detected in noisy network performance data, the presently disclosed technique introduces a new concept called budget. Each cycle in a season is initially assigned a budget or threshold number of abnormal observations. When an observation is considered abnormal and the budget of the observation's cycle has been exceeded, then the working copy for this cycle is not updated, as described above. But when the observation is considered abnormal and the budget of abnormal observations for the observation's cycle has not been exceeded, then the working copy for that cycle must be updated with the abnormal observation in order to loosen the model and to further suppress the excessive number of anomalies.

In order to make the detection real-time while storing a small set of model parameters, the presently disclosed technique supports linear interpolation. Storing a small set of model parameters is critical for the system's scalability. For example, it would not be unusual for a wide-area service to monitor hundreds of thousands of locations in a spatial hierarchy. The presently disclosed technique can detect anomalies every x seconds while the length of one cycle in one season in a model is y (where $x \ll y$). Specifically, every x seconds, a new observation of length y is formed with the previous (y−x) seconds. If the new observation is across the boundary of two cycles, a linear interpolation of the two cycles is used to determine whether the new observation is normal or not.

A more detailed description of a particular implementation of the disclosed system and method will now be presented.

Analysis of Passively Measured RTTs

The objective is to use passive measurement techniques to detect and localize end-to-end performance issues in a CDN service operated by a tier-1 ISP. In particular, the end-to-end TCP round trip time (RTT) is monitored between client hosts and CDN servers. Many applications are extremely sensitive to network RTT (e.g., gaming applications). In the context of CDN service, the TCP throughput of large objects, which are more likely hosted by CDN, are expected to be inversely proportional to RTT, making it an important factor for CDN service providers.

A simple and common way to measure end-to-end RTT is to compare the timestamps of IP packets during the TCP handshake. In the present case, one traffic monitor is installed for each CDN node or data center. The monitor observes the access links that connect the CDN node to the ISP backbone and it is configured to capture TCP handshake packets. When a request is observed, the traffic monitor calculates the time difference between the first SYN (from client to CDN server) and the corresponding ACK that completes the handshake (also from client to CDN server). That becomes the estimated RTT between the CDN node and the client. This RTT includes network propagation delay, any queuing delay (e.g., due to congestion inside network), and server side as well as client side processing delay.

In the present example, the RTT data from three CDN nodes was analyzed over a 10-day period (Apr. 1 to Apr. 10, 2010). The three CDN nodes are located in northeast, southeast and northwest regions of USA respectively. The three datasets are hence named Northeast, Southeast and Northwest. Table 1 summaries the details of the three datasets:

TABLE 1

| Dataset | # Connections | # Client IPs | # Subnets | # Prefixes | # AS paths | # Egress Routers |
| --- | --- | --- | --- | --- | --- | --- |
| Northeast | tens of millions | several millions | 202,252 | 23,869 | 5,116 | several hundreds |
| Southeast | tens of millions | several millions | 41,784 | 3,613 | 649 | several tens |
| Northwest | tens of millions | several millions | 66,464 | 14,269 | 2,583 | several hundreds |

Subnet means the /24 prefix of the client IP address. BGP prefix means the longest matching prefix in the BGP table that covers the client's IP address. AS path means the AS path from the CDN node to the client IP address. Egress router means the router at which data traffic from the CDN node to the client IP address exits the ISP network. To protect proprietary information, the actual numbers of connections, client IPs and egress routers are not listed. For example, for the dataset collected from the Northeast node includes tens of millions of connections that were observed from several millions of client IP addresses, which spanned 202,252 subnets, 23,869 BGP prefixes, 5,116 different AS paths and several hundred different egress routers. Note that the differences in coverage among three datasets are not caused by CDN assignment strategy. Instead, they are due to the incomplete deployment of traffic monitoring devices (for Southeast and Northwest) at the time of the study.

Variability in Client RTT Series

Each TCP connection (e.g. successful handshake) made by a client IP results in a single RTT measurement. The present disclosure simply refers to a series of passively measured RTTs associated with a single client IP as the client RTT series. Those RTT series can be an important performance indicator quantifying the service quality perceived by the CDN clients over time.

Variability across Client RTT Series: The cumulative distribution functions (CDF) of RTTs from all client RTT series in three different datasets is shown in the chart 100 of FIG. 1. Each RTT is normalized by the maximum RTT of all three datasets to protect proprietary information. It is observed that: (a) There is a large disparity in the distribution of RTTs for each dataset. All three datasets show significant variation (4 orders of magnitude) in per-connection RTT. (b) To a large extent the three datasets show a similar RTT distribution. In particular, for every dataset, a large fraction of all RTTs have small or medium values while a small fraction of RTTs have large values.

Those observations suggest that the variability of RTTs across all client RTT series is large. On one hand, the large variability may be due to path diversity—connections from different client IPs traverse different paths and each path may have different typical RTT. For example, a client IP in South America assigned to the Southeast node would more likely experience a greater RTT than a client IP in Florida, simply due to the longer distance. On the other hand, the large variability may be due to time dynamics—the RTTs from the same client IP vary over time. For example, different connections from the same client IP may have different RTTs because of routing change or queuing fluctuation during a day. In the context of anomaly detection, the latter case is more interesting, where different connections from the same client IP have largely varying RTTs. These variations may indicate some potential service performance anomalies. It is, however, clear from FIG. 1 how largely RTTs of different connections from the same client IP vary. To better understand that issue, the variability in RTTs within individual client RTT series is examined next.

Figure 2:
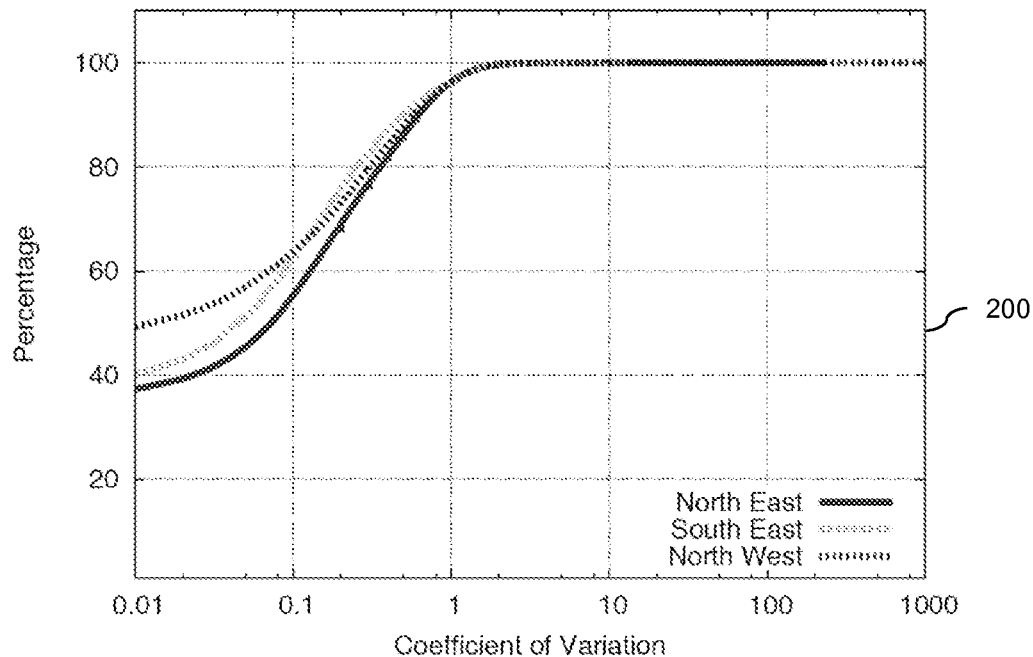
FIG. 2 is a chart showing coefficient of variation for individual client RTT series in three example datasets.

Variability within Individual Client RTT Series: The coefficient of variation (CV) metric is used herein to quantify the variability in RTTs within individual client RTT series. In other words, of interest is the variability in RTTs measured from different requests of the same client IP address during the 10-day period. The cumulative distribution of CV for all client RTT series in each of the three datasets is shown in the chart 200 of FIG. 2. Note that x axis is in log scale. It can be seen from FIG. 2 that all three datasets have similar patterns. Specifically, around 60% of client RTT series have very small CV (less than 0.1), which implies good predictability when using average historical RTTs to forecast future RTTs. Almost 35% of client RTT series show medium CV (ranging from 0.1 to 1), which indicates reasonable predictability. It is also noted, however, that 5% of client RTT series exhibit large CV (ranging from 1 to 240). The large variability observed in these client RTT series suggest that RTT anomaly detection for the corresponding client IPs may be challenging.

Self-inflicted RTT Increase: In examining the 5% client RTT series with huge variability, an interesting phenomenon was discovered that contributes to the large variability: consecutive requests within a very short time period (second or sub second level) have almost monotonic increasing RTT value. For example, in one case, 32 requests were observed from the same client IP having subsequent RTT value increased from 25.84 ms to 202.04 ms within one second.

Based on this behavior, it is believed that the RTT increase is self-inflicted. As recommended by the HTTP 1.1 standard, modern browsers such as IE7, Firefox, Safari and Opera use multiple TCP connections in parallel to fetch different objects on the same page. Although HTTP 1.1 recommends two parallel TCP sessions, most of the latest releases of these browsers use many more concurrent connections: Firefox 3.5.9 and IE8 use six and Safari 4.0.5 uses four TCP sessions. Thus TCP SYN-ACKs from the CDN server are likely queued one after another at the client side access link or in the processor buffer. Furthermore, data packets from different web servers may also get into the queue—for example, advertisements, javascripts, and stylesheet files on the same webpage may not be hosted on the CDN server. Since each 100-byte packet queued over a 64 kbps access link would increase the RTT of subsequent TCP sessions by 12.5 ms, it can quickly create a significant increase over several packets. Such self-inflicted RTT increases do not reflect any real performance problem for the CDN service, and therefore should be carefully handled when client RTT series are used for performance impairment detection.

Sparsity of Client RTT Series

RTT measurements are only collected when a client IP contacts a CDN node. In order to have timely measurements to detect network performance issues along the path between client IPs and CDN nodes, client IPs need to communicate with CDN nodes often enough. In order words, if a client IP doesn't contact a CDN node very often, its client RTT series may be too sparse to reflect any problem along the path that client IP travels. In order to understand how often a client IP contacts a CDN node, the CDF of number of connections is first plotted for individual client IPs using the three datasets.

Figure 3:
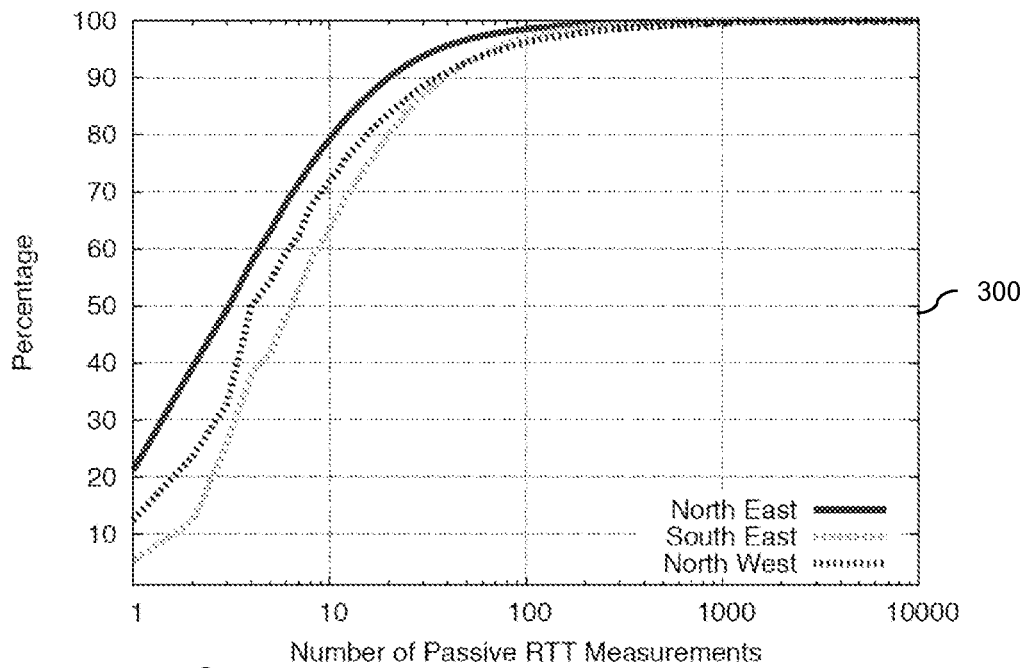
FIG. 3 is a chart showing number of measurements in client RTT series in three example datasets.

A study of the distribution of the number of measurements in a client RTT series such as that shown in the graph 300 of FIG. 3 reveals that most of client IPs have very few connections over a 10-day period. That is true of all three data sets. More specifically, in Northeast dataset, 80% client IPs have fewer than 10 connections; in Southeast dataset, 70% client IPs have fewer than 10 RTT measurements; in Northwest dataset, 65% client IPs have fewer than 10 connections. In other words, 10 passive measurements from 10 connections are too few to reflect performance problems on the path over a period of 10 days. The number of RTT measurements alone may not be sufficient to determine the measurement sparsity. For example, even though a client IP contacts a CDN node many times within the same second, if it doesn't contact the CDN node at other times, its client RTT series is still considered sparse as all these measurements only reflect the path performance at that single second.

Figure 4:
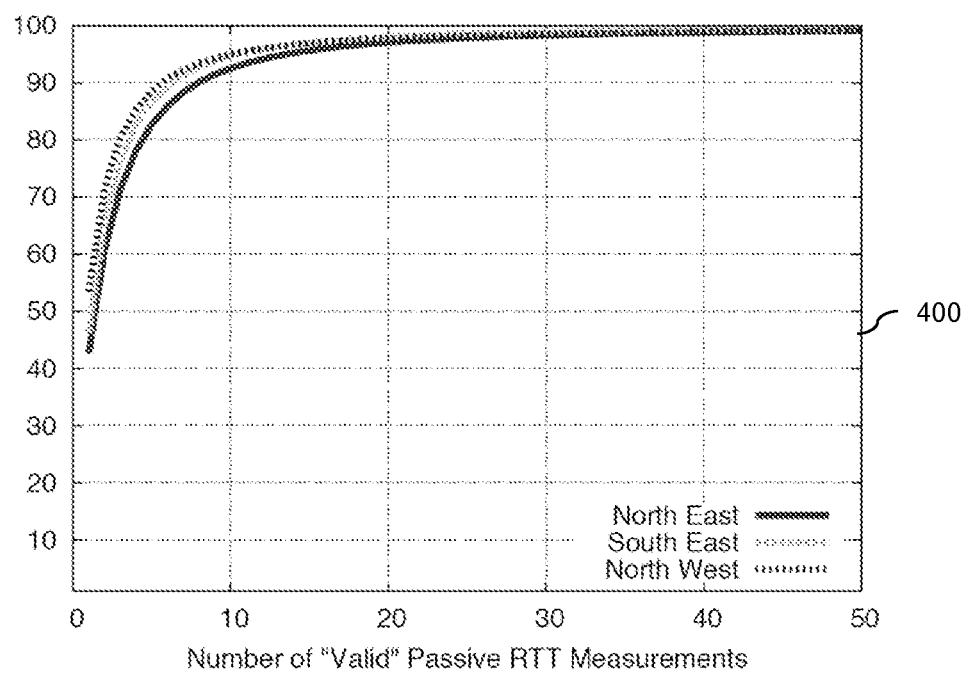
FIG. 4 is a chart showing distribution of number of available measurements in client RTT series in three example datasets.

In order to better understand the sparsity of client RTT series, a RTT measurement is defined to be "valuable" only if it is at least 600 seconds later than the previous RTT measurement. In general, path RTT measurements appear steady for at least 600 seconds. Passive measurements within a period of 600 seconds should therefore be considered as a single sample of end-to-end RTT. Ideally, it is desirable to have one passive measurement every 600 seconds in order to better monitor the path RTT. The chart 400 of FIG. 4 shows the distribution of the number of "valuable" measurements in a client RTT series. FIG. 4 shows that most of the client IPs have even fewer "valuable" RTT measurements over a 10-day period compared to FIG. 3. For all three datasets, 90% client IPs have less than 10 "valuable" RTT measurements.

As the presently described approach purely depends on passive monitoring, the system cannot solve the sparsity problem by actively changing how often clients contact CDN nodes. All of these suggest client RTT series are too sparse to detect service performance issues.

Summary of the Analysis of Passively Measured RTTs

A naive approach of detecting end-to-end performance issues would be applying anomaly detection algorithms directly on the client RTT series. In other words, for each client IP, keep track of its client RTT series and detect abnormal RTTs deviated from its normal behavior that is built based on the history. But the above analysis suggests there are several limitations in this naive approach: (i) Scalability: It won't scale with respect to the number of client IPs. For example, in Northeast dataset, there are several millions of client IPs during a 10-day period. It is not trivial to keep track of several millions of client IPs. (ii) Sparsity: Client RTT series usually are too sparse to conduct a statistical anomaly detection. (iii) Variability: The large RTT variability within some client RTT series makes anomaly detection challenging.

Topological aggregation of RTTs

Figure 5:
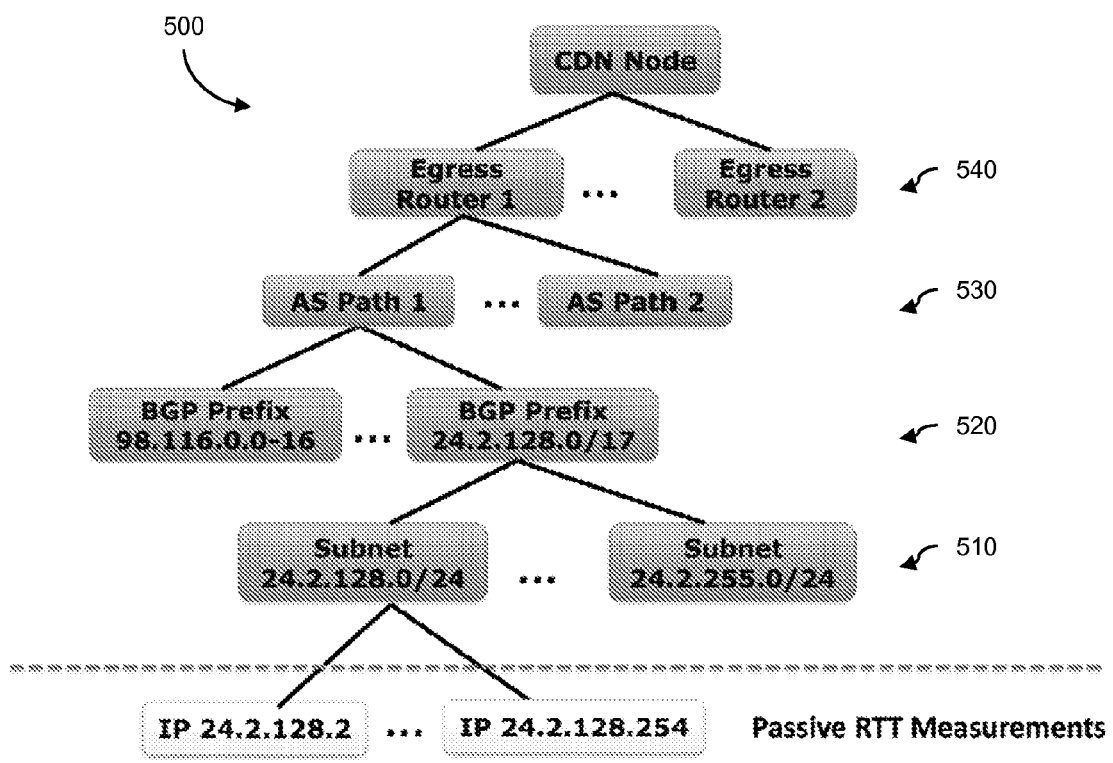
FIG. 5 is a diagram showing an example topological hierarchy of client RTT series in a typical wide area network.

As anomaly detection based on client RTT series is not practical, a different approach is adopted by aggregating client RTT series into higher level clusters according to the topological hierarchy. In order to illustrate the idea of aggregation, the hierarchy shown in FIG. 5 is used as an example, where the client RTT series are aggregated into subnet clusters 510, BGP prefix clusters 520, AS path clusters 530 and egress router clusters 540. In other words, for each cluster in high levels, an aggregate RTT series is formed by aggregating the client RTT series from all the client IPs that are its children in the hierarchy. As a result, an anomaly detection approach can be applied on the newly formed aggregate RTT series instead of the client RTT series.

This approach immediately solves the first problem of anomaly detection for individual client IPs. More specifically, scalability is not a big issue here as there are much fewer higher level clusters that must be kept track of compared to the number of individual client IPs. Using the Northeast dataset as an example, after aggregating, instead of monitoring several millions of client IPs, it is now necessary to keep track of only 202,252 subnets, 23,869 BGP prefixes, 5,116 AS paths and several hundred egress routers.

Moreover, individual client IP level anomalies are not meaningful for localizing performance issues, as operators are more interested in a network event that affects the RTTs of a large number of client IPs. For example, if most of the client IPs that traverse the same AS path experienced abnormal RTTs during a time period, it is more meaningful to report a single AS path anomaly to operators compared with reporting many anomalies for individual client IPs. Due to aggregation, the anomalies are naturally reported for subnets, BGP prefixes, AS paths and egress routers. They are more useful to localize performance issues compared to individual client IP anomalies.

Spatial Locality Among Client RTT Series

Aggregating clients into clusters based on topological hierarchy only makes sense if client IPs that are topologically close to each other have similar client RTT series. Towards this end, client RTT series are clustered at different aggregation levels and examined to determine whether client RTT series in the same cluster are similar. Specifically, for each client RTT series, one key statistical indicator such as median and minimum is extracted. Then the similarity test among client RTT series is done by using this key statistical indicator.

Here the four different aggregation schemes are considered: subnet aggregation, BGP prefix aggregation, AS path aggregation and egress router aggregation. A random aggregation is also conducted for comparison. First client RTT series are aggregated into clusters according to different aggregation schemes. Only client RTT series having at least 100 measurements are considered to keep the computation meaningful. Then, for each cluster, the median (or minimum) RTT is calculated for each client RTT series in the cluster, and then the CV of those median (or minimum) RTTs is calculated. In other words, the smaller the CV is, the stronger spatial locality is.

Figure 6:
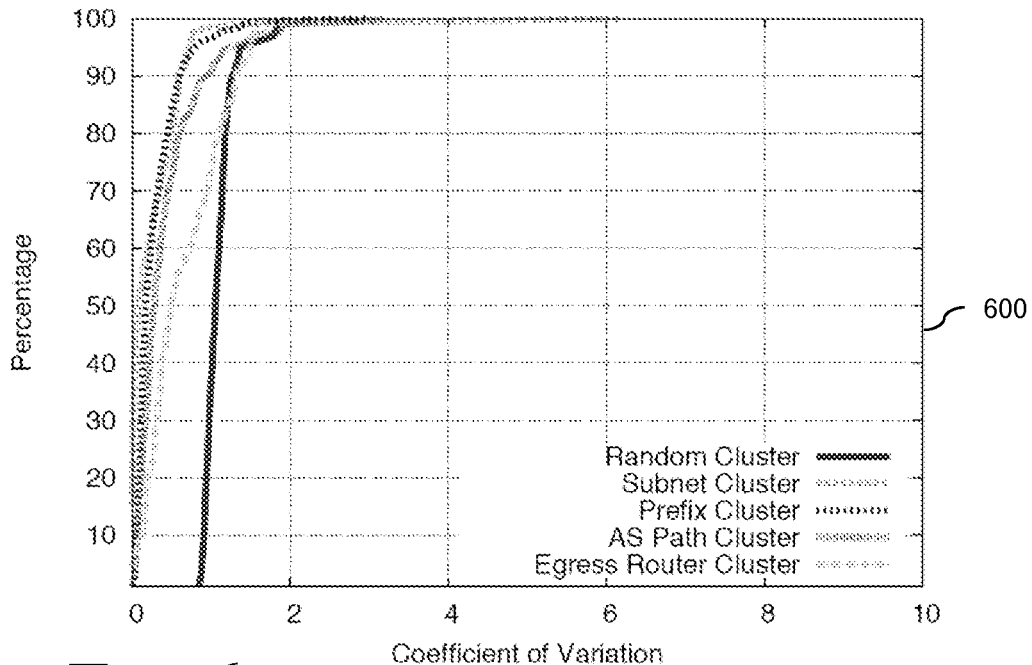
FIG. 6 is a chart showing distribution of coefficient of variation for clusters, using minimum as the key statistical indicator for each client RTT series.
Figure 7:
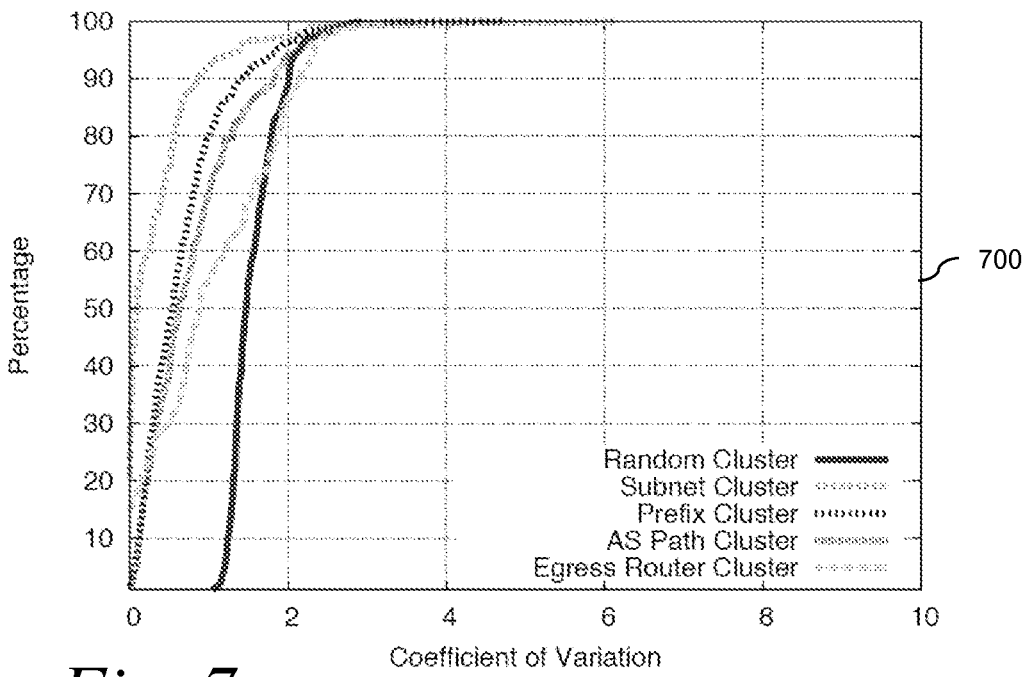
FIG. 7 is a chart showing distribution of coefficient of variation for clusters, using median as the key statistical indicator for each client RTT series.

FIG. 6 and FIG. 7 plot the CDF of CV for clusters using minimum and median as the statistical indicator respectively. Those plots 600, 700 are generated based on the Northeast dataset. Overall there can be seen from both plots that aggregations on subnet level, BGP prefix level, AS path level and egress router level all exhibit significant stronger spatial locality than random aggregation. Both plots also suggest that spatial locality is strongest in subnet level aggregation; BGP prefix aggregation and AS path aggregation show a similar degree of spatial locality; egress router aggregation exhibits a less significant degree of spatial locality than others. Even though all aggregation levels in the topological hierarchy exhibit a significant degree of spatial locality, the percentage of clusters that show no spatial locality or very limited degree of spatial locality increases as the aggregation level moves up in the hierarchy. For example, the graph 700 of FIG. 7 shows the max coefficient of variation for random aggregation is 2.93 while there are almost 0.4% clusters at prefix aggregation level have coefficient of variation larger than 0.4%. The number for AS path and egress router aggregation levels are 0.4% and 2%. The same experiments were also conducted using Northwest and Southeast dataset and they show similar results.

Sparsity of Aggregate RTT Series

Figure 8:
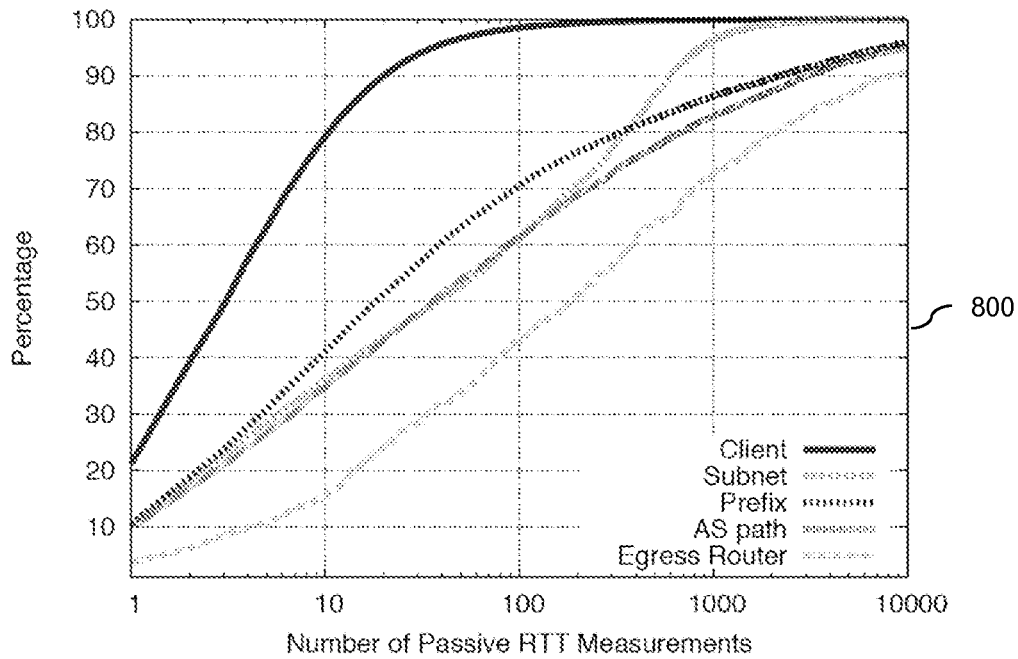
FIG. 8 is a chart showing distribution of number of RTT measurements at different aggregation levels.

In addition to reducing the number of entities to track, aggregation may also overcome some of the sparsity problems seen when tracking individual client RTT series. As one may expect, the number of RTT measurements at aggregation levels increases significantly compared to individual client IPs. The plot 800 of FIG. 8 shows that for Northeast dataset, only 20% of client IPs have more than 10 measurements while 65% of subnets, 60% of prefixes, 65% of AS paths and 85% of egress routers have more than 10 measurements. The reason why more BGP prefixes have less than 10 measurements compared to subnets is that there are many BGP prefixes that have a length longer than 24 (subnet) in the BGP data.

Figure 9:
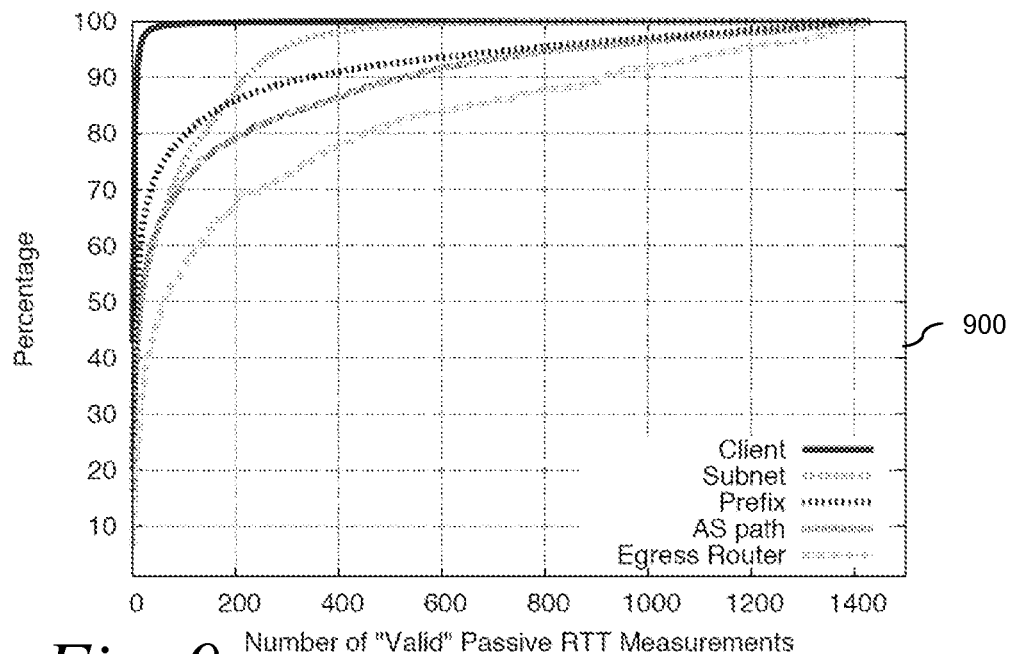
FIG. 9 is a chart showing distribution of number of "valuable" RTT measurements at different aggregation levels.

As above, an RTT measurement is further defined to be "valuable" only if it is at least 600 seconds later than the previous RTT measurement. The plot 900 of FIG. 9 shows that, for Northeast dataset, most of clusters at all different aggregation levels have many more "valuable" RTT measurements compared to individual client IPs.

The above analysis suggests that sparsity is significantly improved at aggregation levels. The same experiments were conducted using Northwest and Southeast dataset, yielding similar results.

Variability in Aggregate RTT Series

Figure 10:
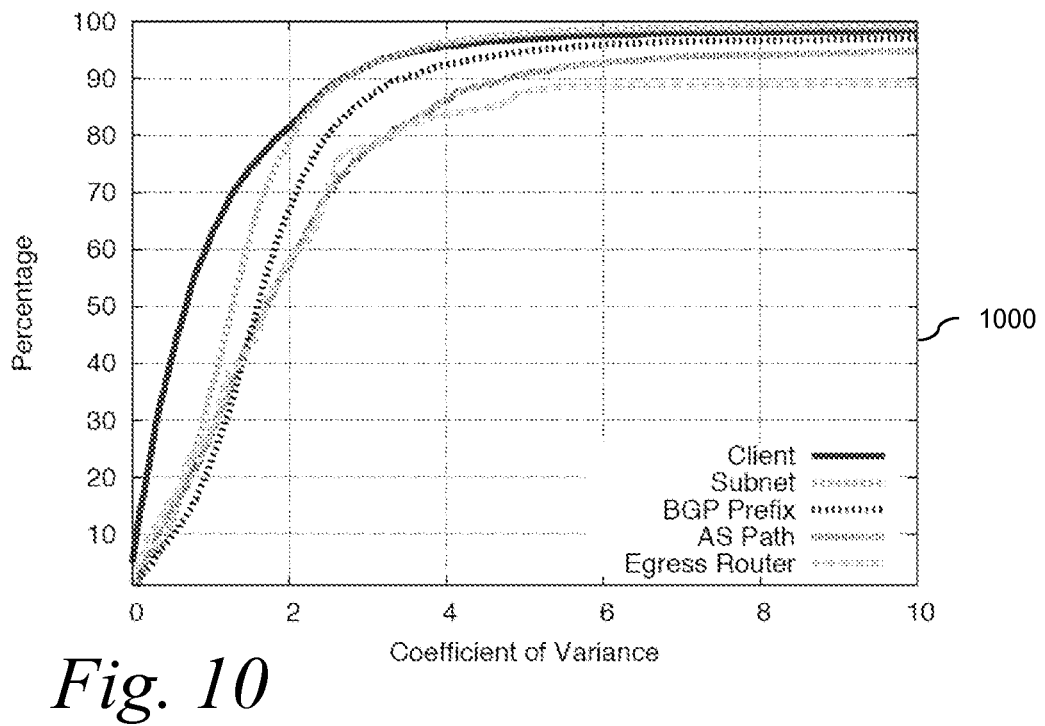
FIG. 10 is a chart showing distribution of coefficient of variation at different aggregation levels.

The above analysis suggests that anomaly detection based on aggregated RTT series addresses the scalability and sparsity issues, and makes sense due to the existence of spatial locality. However, aggregating multiple client RTT series into a single aggregate RTT series will likely cause a larger variability than the variability in client RTT series as shown in plot 200 of FIG. 2. The plot 1000 of FIG. 10 shows the coefficient of variation at different aggregation levels using dataset Northeast. As expected, as the aggregation level moves up in the hierarchy, a greater likelihood of larger variability is seen. The variability difference between AS path level and egress router is not significant.

Summary of Topological Aggregation of RTTs

Aggregating client RTT series along the topological hierarchy addresses the scalability issue and the measurement sparsity issue. It also naturally provides the ability of isolating performance anomalies due to the topological significance in the hierarchy. Aggregate RTT series, however, have larger variabilities than client RTT series, which makes anomaly detection very challenging. In the next section is discussed how to deal with the large variability in aggregate RTT series for better anomaly detection.

Example System Design

In this section is described an exemplary passive hierarchical anomaly detection and localization system. The example system turns the individual client RTT series from an ISP's CDN service into prioritized and localized service anomaly events. The example system operates in streaming fashion: as a client RTT series stream arrives in real time, the severity and scope of on-going service anomaly events are updated.

The design of the example system is based on insights acquired through the data analyses presented above. Particularly, a five-stage approach is tailored for the variability and sparsity of client RTT series:

(i) Spatial aggregation: group client RTT series according to the requesting client IP address into aggregate RTT series at various levels such as subnet, BGP prefix, AS path, and ISP egress router level.

(ii) Temporal aggregation: at all levels, organize the aggregate RTT series into bins and compute a representative RTT from each bin to form a representative RTT series.

(iii) Anomaly detection: use online anomaly detection scheme to extract service anomaly events from the representative RTT series.

(iv) Event localization: localize the scope of anomaly events.

(v) Event prioritization: prioritize localized anomaly events by factors such as severity, lasting duration and impact scope.

Figure 11:
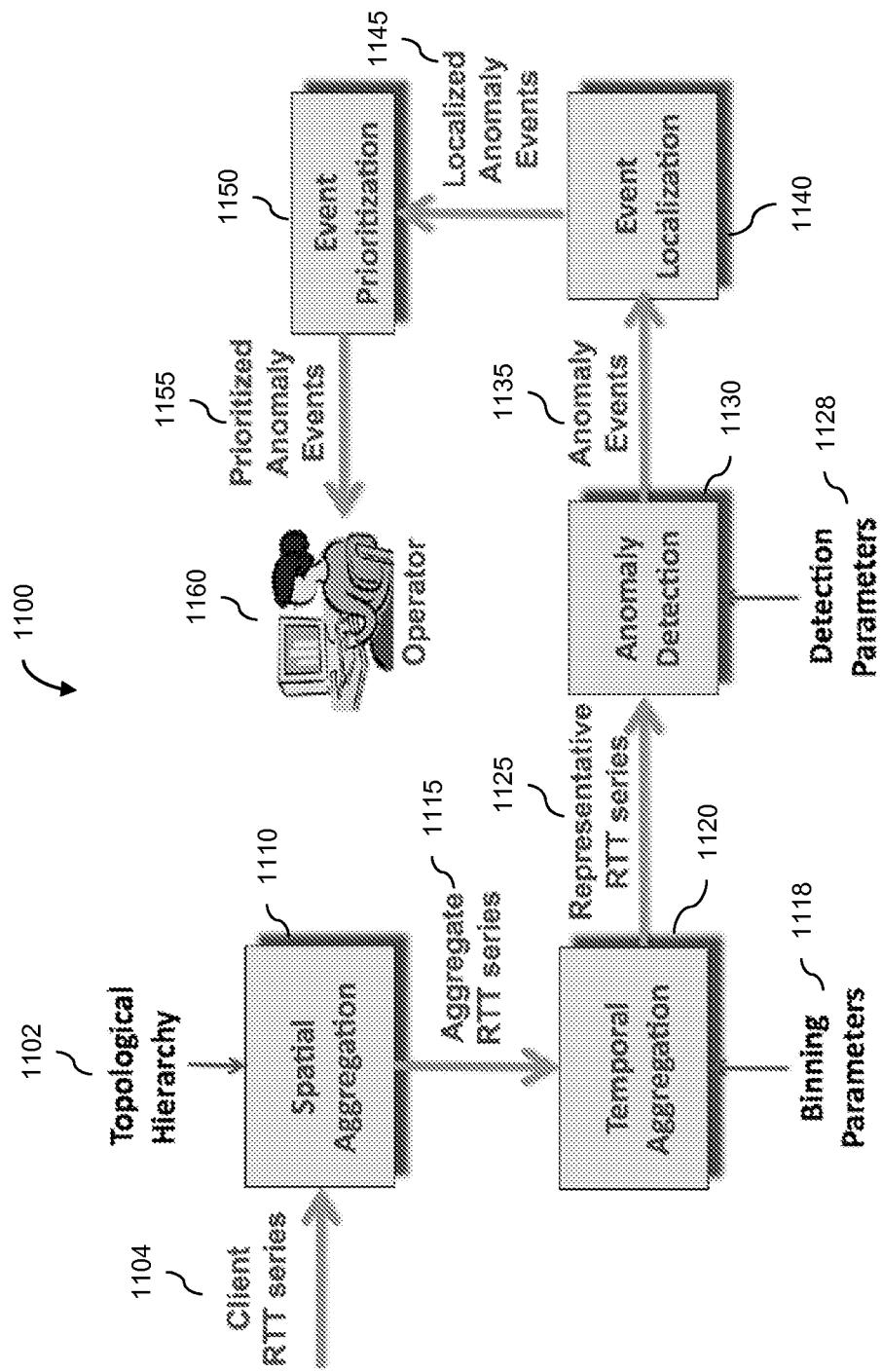
FIG. 11 is a diagram showing the system architecture of an example system according to one embodiment of the invention.

Each of the five stages of the example system is now described in detail with reference to a chart of the system 1100 shown in FIG. 11.

Spatial Aggregation Stage

In a spatial aggregation stage 1110, client RTT series streams 1104 arrive in real time, and are grouped into many aggregate RTT series 1115 at different levels according to the topological hierarchy 1102.

To cope with the self-inflicted RTT increase phenomena described above, a suppression may be performed on client RTT series. If multiple RTT measurements from the same client RTT series are observed within one second, only the minimum RTT value is taken. A one second suppression window has been found quite effective in removing the artifact due to client-side queuing while keeping the chance of false suppression (such as due to NAT) low.

Figure 12:
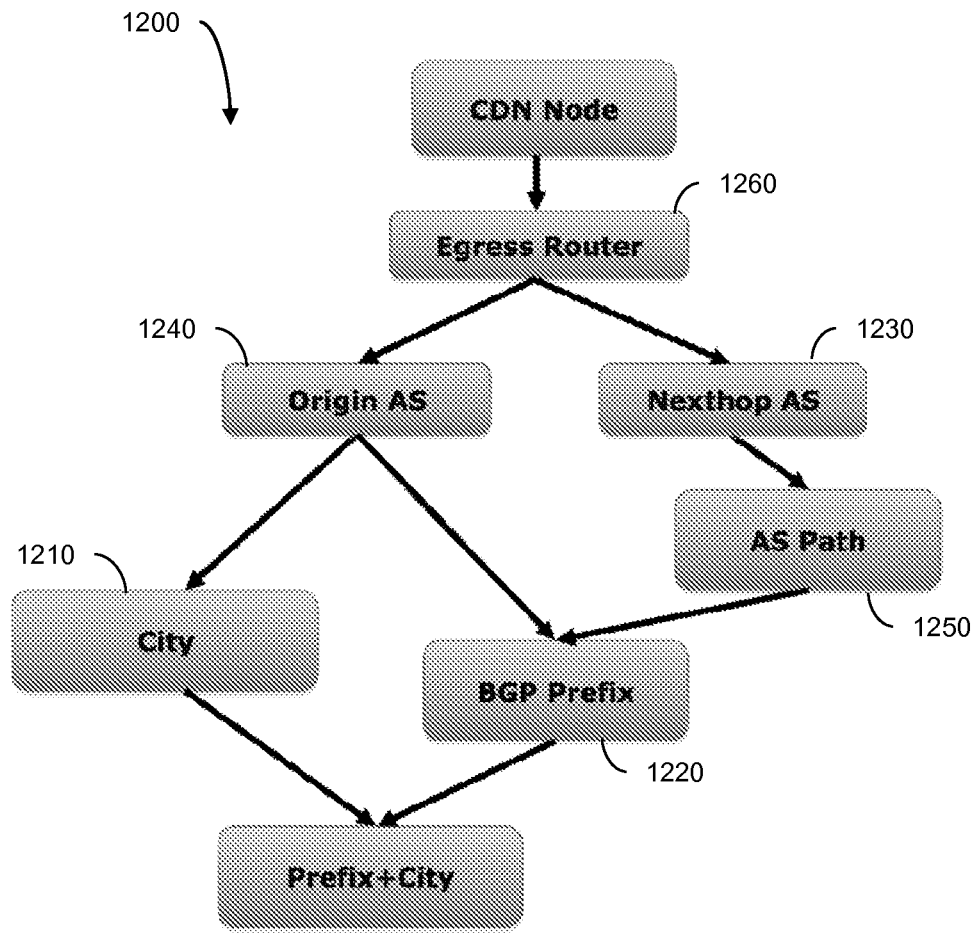
FIG. 12 is a diagram showing topological hierarchy of client RTT series as used in an example system according to one embodiment of the invention.

The client RTT series are grouped according to the requesting client IP address into aggregate RTT series 1115 according to the hierarchy 1200 shown in FIG. 12. Note that the hierarchy 500 shown in FIG. 5 is a simplified version compared with the hierarchy 1200 used in the present exemplary embodiment. While the mapping from IP address to city 1210 depends on a static geo-location database, the mapping to BGP prefix 1220, next-hop AS 1230, origin AS 1240, AS path 1250 and egress router 1260 all require dynamic correlation with BGP information. That is done by periodically collecting BGP dumps from the route reflectors co-located with the CDN servers. In one example system, the BGP dump is acquired on an hourly basis.

Temporal Aggregation Stage

At the temporal aggregation stage 1120, aggregate RTT series 1115 are organized into bins at all levels of topological hierarchy, to produce a smooth representative RTT series 1125. Binning is a classic data processing technique for data smoothing, which is much needed as demonstrated by the high variability of aggregate RTT series discussed above.

Two types of binning methods may be used: fixed size bin and fixed time bin. Binning parameters 1118 define the binning method and parameters used by the binning method. For a fixed bin size, aggregate RTT series is divided into equal sized groups of (IP level) RTT measurements. In one example, a group size of 100 is used. For fixed time bin, aggregate RTT series is divided into equal length (e.g., 10 minutes) groups. Comparing the two approaches, fixed time bin is more intuitive, however it is more sensitive to data sparsity, and smoothing over one or a few data samples is ineffective. Fixed size bin, on the other hand, is more sensitive to variability due to changes in the composition of different client IPs across the Internet. In one implementation, the system runs in either fixed time bin mode or fixed size bin mode. Alternatively, the system may run a combination of the two modes.

Once bins are formed, the temporal aggregation stage computes a representative RTT value for each bin to form the representative RTT series 1125. Several statistics can be used as the representative value: a minimum, a maximum, an average, a median or another percentile values. Different statistics may have advantage for tracking certain type of issues. For example, the minimum RTT may well capture baseline RTT due to network propagation delay, while being oblivious to varying queuing delay that may be due to network congestion. The maximum or average RTT can capture poor performing individual requests performance.

Since the goal is to detect general service performance issues that impact a relatively large collection of users, median RTT was picked as the representative for each bin in the example system. It was found that median RTT is quite effective in tracking service side or network side issues while being robust to individual RTT variability due to client side processing or local access queuing delays.

Anomaly Detection Stage

Service anomaly events 1135 are then detected at different levels by the anomaly detection stage 1130. To transform the representative RTT series 1125 into anomaly events 1135, an online time series anomaly detection algorithm is required. In the example system, a modified Holt-Winters algorithm is adopted. The modified Holt-Winters algorithm is built based on the classic additive Holt-Winters algorithm, a widely used one-pass online anomaly detection method. The Holt-Winters algorithm has found many applications in Internet traffic analyses due to its simple yet effective model, which represents a process with three exponential smoothing processes.

Like the classic Holt-Winters algorithm, the modified Holt-Winters algorithm decomposes the time series into three components: a baseline, a linear trend, and a seasonal effect. The modified Holt-Winters algorithm of the present disclosure keeps two copies, a working copy and a shadow copy, of each of the three components. Each copy is updated in parallel using different parameters. The working copy gives more weight to the process history as opposed to recent observations, and also ignores anomalies for updating itself. The working copy updating parameters are therefore desirable for anomaly detection when the underlying RTT distribution is stable. The shadow copy gives more weight to the recent observations, so that when the RTT distribution changes (due to routing changes or some other events) it can quickly adapt to the new RTT distribution.

Specifically, upon seeing a new observation, the modified Holt-Winters algorithm computes the deviation score of the observation from the time series forecast that is calculated from the three components in the working copy. A deviation threshold is used to determine whether the observation is normal or abnormal. If the observation is considered normal, both the working copy and the shadow copy are updated in the same way as in the classic additive Holt-Winters algorithm. If, on the other hand, the observation is considered abnormal, only the shadow copy is updated. Once the number of consecutive or almost consecutive abnormal observations exceeds some threshold, suggesting that the underlying RTT distribution has changed, the modified Holt-Winters algorithm copies the shadow copy over the working copy as the shadow copy should have adapted to the new underlying RTT distribution.

Because the modified Holt-Winters algorithm has the same set of parameters as the classic additive Holt-Winters algorithm, the same guidelines are followed for the parameter selection. Parameters corresponding to a low adaptability level are chosen.

For each observation, the output of the modified Holt-Winters algorithm is a deviation score d that matches that in a standard Guassian distribution. The output is descretized into six levels in preparation for a ranking algorithm of the later event prioritization stage. Abnormality level $\mathcal{A}$ =0, 1, 2, 3, 4, 5 when the absolute value of deviation score |d| is in [0, 0.5), [0.5, 1), [1, 1.5), [1.5, 2), [2, 2.5) and [2.5,∞) respectively. $\mathcal{A}$ of 4 or above is considered anomalous. This is a relatively aggressive setting (i.e., more anomalies). The setting is appropriate, however, as the subsequent event localization and prioritization stages are robust to false positives.

Consecutive anomalous bins are further combined into single anomaly events 1135. The example system keeps track of all ongoing anomaly events, with the begin time of the event being the begin time of the first anomalous bin. The anomaly events are detected and updated at all different levels of the topological hierarchy shown in FIG. 12.

Event Localization Stage

The detected anomaly events 1135 are localized by an event localization stage 1140 using a greedy heuristic. In the example system 1100, a single underlying network event such as a link failure may manifest itself at different hierarchy levels. For example, if an underlying network event has caused an increase of RTT for all user requests associated with a common BGP prefix, the example system by design should detect the RTT anomaly for the BGP prefix involved. Due to the nature of BGP routing, those requests should share the same origin AS and AS path, and if the user requests from the BGP prefix dominate other requests of the same origin AS or AS path, the example system would also detect RTT anomalies for the corresponding origin AS and the AS path. In that case, it is desirable for the example system to localize the anomaly to the BGP prefix and report a single anomaly event. In another example, if a network event has impacted an entire AS path and created a service anomaly, all its associated children at the lower hierarchy level locations, such as the associated BGP prefixes, would experience service anomalies as well. In that case, it is desirable for the example system to localize the anomaly to the AS path and report only that anomaly. Given a set of anomalies detected at various hierarchy levels, the goal of event localization, in accordance with the Occam's razor principle, is to identify the smallest set of root anomaly events that can explain the found anomalies as reasoned in the examples above.

The following is a detailed formulation of the event localization problem (ELP). These notations are used: In ELP, the topological hierarchy (for example, see the hierarchy 1200 of FIG. 12) is a directed acyclic graph (DAG). Let N represent the set of nodes in the topological hierarchy. $\forall n \in N$, D(n) denotes the set of n's descendants (i.e. nodes can be reached from n by traversing edges). $\forall n \in N$, A(n) denotes the set of n's ancestors (i.e. nodes can reach n by traversing edges). $\forall n \in N$, d(n) denotes the set of n's direct descendants (i.e. nodes can be reached from n by traversing only one edge). $\forall n \in N$, a(n) denotes the set of n's direct ancestors (i.e. nodes can reach n by traversing only one edge). The topological hierarchy has the following two properties.

(P1) Each node is in one of the three status: abnormal, normal or insufficient measurements.

$$\forall n \in N : f(n) = \begin{cases} 1 & \text{if } n \text{ is abnormal} \\ 0 & \text{if } n \text{ is normal} \\ -1 & \text{if insufficient measurements for } n \end{cases}$$

(P2) Each abnormal node has at least one abnormal or "insufficient measurements" descendant.

$$\forall n \in N : f(n) = 1 \Rightarrow \exists x \in D(n) : f(x) = 1 \lor f(x) = -1$$

Objective Function: $\underset{A \subseteq N}{\mathrm{argmin}} |A|$

The goal of ELP is to find a smallest subset $A$ subject to the following three constraints (C1-C3):

(C1) Each node in $A$ must be abnormal.

$$\forall a \in A : f(a) = 1$$

(C2) Each abnormal node in N is either in $A$ or is a descendent of a node in $A$ or an ancestor of a node in $A$. In other words, all abnormal nodes are covered by the subset $A$.

$$\forall n \in N: f(n)=1 \Rightarrow \exists a \in A : n=a \vee n \in D(a) \vee n \in A\ (a)$$

(C3) For any node in $A$, the number of its direct abnormal and "insufficient measurements" descendants is larger than the number of its direct normal descendants.

$$\forall a \in A : |\{x \in d(a)|f(x)=1 \wedge f(x)=-1\}| > |\{x \in d(a)|f(x)=0\}|$$

It may further be shown that the event localization problem is NP-hard. That proof is not presented here due to space limitations.

A greedy heuristic such as the following may be used in solving sparsity maximization problem.

Using the set-covering terminology, all the abnormal nodes in the topological hierarchy form the universe. By picking an abnormal node x that satisfies the constraints C1 and C3 above, a subnet $S_x(S_x=x\cup D(x)\cup A(x))$ of the universe is formed. For each ELP instance, there is a family of n subsets $(S_1, S_2, \ldots, S_n)$ that correspond to n abnormal nodes that satisfy the constraints C1 and C3. The goal of ELP is to find the smallest subfamily from whose union is the universe. The following is a simple greedy algorithm for the event localization problem, which keeps choosing the abnormal nodes (subsets in set-covering problem) that covers most uncovered abnormal nodes (elements in universe in set-covering problem) until all abnormal nodes (the whole universe in set-covering problem) are covered:

```
Let A denote the output subset
Initialize A = 0, UNCOV = {x ∈ N|f(x) = 1}
for each u ∈ UNCOV do
    SET_u = u
    for each v ∈ D(u) do
        if f(v) = 1 then
            SET_u = SET_u ∪ v
        end if
    end for
    for each W ∈ a(U) do
        if f(w) = 1 then
            SET_u = SET_u ∪ w
        end if
    end for
end for
while UNCOV ≠ 0 do
    Choose u ∈ UNCOV such that | SET_u | is maximized
    A = A ∪ u
    UNCOV = UNCOV − SET_u
    for each i ∈ UNCOV do
        SET_i = SET_i − SET_u
    end for
end while
```

Event Prioritization Stage

After the event localization stage 1140, the example system employs a ranking function in an event prioritization state 1150 to prioritize the localized anomaly events 1140 to produce prioritized anomaly events 1155 that may be reviewed by an operator 1160. The ranking function incorporates two factors: the significance of the relative size of the anomaly and the breadth of its impact scope. The former can be measured by the deviation score |d| from Holt-Winters algorithm. The latter can be measured by the number of distinct client IP addresses observed in the anomalous bin, which is denoted as c. Distinct client IP addresses (as opposed to total request counts) were chosen since it is robust against anomalies dominated by a spike of requests from a few outlier clients. Since each anomaly event may contain multiple anomalous bins, the aggregate score of all bins is used for the score of the event. Specifically, for anomaly event e, its baseline ranking score $r_e$ is defined as:

$$r_e \in \Sigma |d_b| \times c_b$$

b∈bins of e where $d_b$ and $c_b$ is the deviation score and distinct IP count for bin b. In that way, long lasting events are likely given higher priority than short events.

All the above stages 1110, 1120, 1130, 1140, 1150 operate in streaming fashion, which means events start with some initial RTT measurements and evolve in terms of priority and duration as more and more RTT measurements arrive. The example system presents all on-going anomaly events with their priority and duration so that operators 1160 can keep track of them.

Implementation

Figure 13:
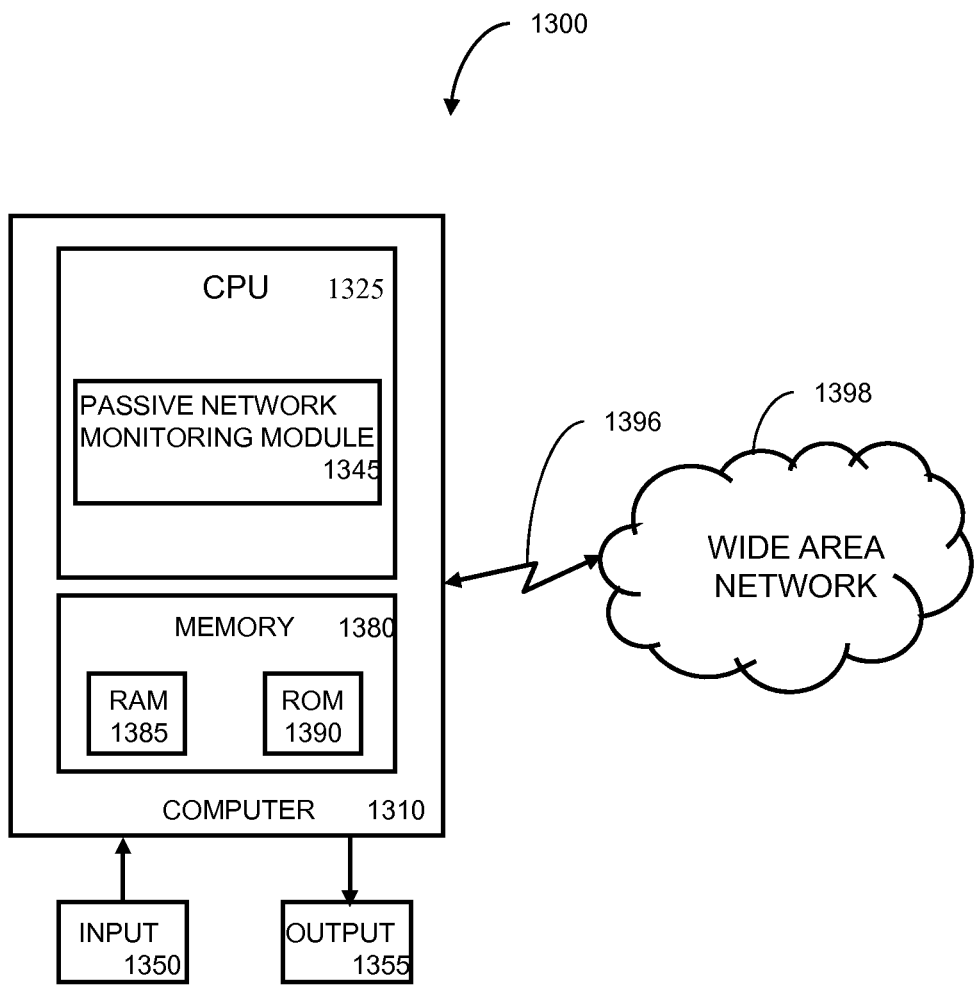
FIG. 13 is a schematic block diagram showing a hardware implementation according to one embodiment of the invention.

A computer system 1300 for passively monitoring a wide-area network to detect and localize end-to-end performance issues, according to an exemplary embodiment of the present invention, is illustrated in FIG. 13. In the system 1300, a computer 1310 performs elements of the disclosed method. While the computer 1310 is shown as a single unit, one skilled in the art will recognize that the disclosed steps may be performed by a computer comprising a plurality of units linked by a network or a bus.

The computer 1310 may be a portable handheld device or a desktop or laptop computer or any other device that includes a display. The computer 1310 receives data from any number of data sources that may be connected to the computer, including a wide area data network 1398 that may be connected to the computer via a connection 1396.

The computer 1310 includes a central processing unit (CPU) 1325 and a memory 1380. The computer 1310 may be connected to an input device 1350 and an output device 1355. The input 1350 may be a mouse, network interface, touch screen, etc., and the output 1355 may be a liquid crystal display (LCD), cathode ray tube (CRT) display, printer, etc. The computer 1325 may be connected to a network, with all commands, input/output and data being passed via the network. The computer 1325 can be configured to operate and display information by using, e.g., the input 1350 and output 1355 devices to execute certain tasks.

The CPU 1325 includes one or more passive network monitoring modules 1345 that are configured for performing one or more methods for monitoring a network as discussed herein.

The memory 1380 includes a random access memory (RAM) 1385 and a read-only memory (ROM) 1390. The memory 1380 may also include removable media such as a disk drive, tape drive, memory card, etc., or a combination thereof. The RAM 1385 functions as a data memory that stores data used during execution of programs in the CPU 1325 and is used as a work area. The ROM 1390 functions as a program memory for storing a program executed in the CPU 1325. The program may reside on the ROM 290 or on any other tangible or non-volatile computer-usable medium as computer readable instructions stored thereon for execution by the CPU 1325 or another processor to perform the methods of the invention. The ROM 1390 may also contain data for use by other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

CONCLUSION

Described above is a passive and comprehensive performance anomaly detection system, which helps ISPs monitor the quality of services. In contrast to the current active probing based systems, the present system needs only a few monitoring points to monitor the service quality comprehensively. In contrast to the current active probing based systems, the present system detects anomalies based purely on passive monitored traffic without the injection of probe packets into the network. Further in contrast to current active probing based systems, the presently described system detects anomalies that affect real users other than the probing agents. Finally, in contrast to the current active probing based systems, which typically detect problems for end-to-end paths, the presently described system detects anomalies at different locations in a spatial hierarchy that comprises a relatively large collection of users. That locational detection can directly guide the operators' troubleshooting.

The presently disclosed system and method may be used in a variety of network applications. For example, service monitoring points may be placed at access routers of data centers. The spatial hierarchy used in the presently described system detects performance issues at various location types.

In another example, cellular service monitoring points are placed between a Serving GPRS Support Node (SGSN) and a Gateway GPRS Support Node (GGSN). The spatial hierarchy used in the presently disclosed system detects performance issues at SITEID, RNC, SGSN, Sub-Market and Market levels.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for detecting an anomaly event in a computer network comprising a plurality of clients, comprising:
    determining, by a computer, a plurality of series performance metrics, each one of the series performance metrics representing a time series of performance measurements of connections made to one of the plurality of clients;
    spatially aggregating, by the computer, the series performance metrics according to a spatial hierarchy to create a plurality of spatial clusters;
    in each spatial cluster of the plurality of spatial clusters, temporally aggregating, by the computer, series performance metrics to form a time series of temporal bins;
    for each temporal bin of the time series of temporal bins, determining, by the computer, an actual temporal bin metric representative of time series performance metrics in the temporal bin; and
    for each temporal bin of the time series of temporal bins:
        determining, by the computer, a forecast temporal bin metric from actual temporal bin metrics determined for temporal bins preceding the temporal bin; and
        comparing, by the computer, an actual temporal bin metric of the temporal bin with the forecast temporal bin metric to detect the anomaly event.

2. The method of claim 1, wherein the performance measurements of connections made to one of the plurality of clients comprise client round trip time measurements.

3. The method of claim 2, wherein the round trip time measurements are separated from each other by at least 600 seconds.

4. The method of claim 2, further comprising:
    suppressing client round trip time measurements by using only a minimum round trip time measurement in each of a plurality of time windows.

5. The method of claim 1, wherein spatially aggregating the representative series performance metrics comprises aggregating according to a requesting client IP address.

6. The method of claim 1, wherein spatially aggregating the representative series performance metrics comprises aggregating into spatial clusters based on at least one of a subnet, a border gateway protocol prefix, an autonomous system path and an Internet service provider egress router level.

7. The method of claim 1, wherein determining actual temporal bin metrics for each temporal bin comprises determining a median of the time series performance metrics in the temporal bin.

8. The method of claim 1, wherein comparing an actual temporal bin metric of the temporal bin with the forecast temporal bin metric to detect the anomaly event further comprises using an enhanced Holt-Winters anomaly detection algorithm.

9. A non-transitory computer-readable medium having computer readable instructions stored thereon for execution by one or more processors to perform a method for detecting anomaly events in a computer network comprising a plurality of clients, the method comprising:
    determining a plurality of series performance metrics, each one of the series performance metrics representing a time series of performance measurements of connections made to one of the plurality of clients;

spatially aggregating the series performance metrics according to a spatial hierarchy to create a plurality of spatial clusters including a first spatial cluster;

in each spatial cluster of the plurality of spatial clusters, temporally aggregating series performance metrics to form a time series of temporal bins;

for each temporal bin of the time series of temporal bins, determining an actual temporal bin metric representative of time series performance metrics in the temporal bin; and for a each temporal bin of the time series of temporal bins:

determining a forecast temporal bin metric from actual temporal bin metrics determined for temporal bins preceding the temporal bin; and comparing an actual temporal bin metric of the temporal bin with the forecast temporal bin metric to detect the anomaly event.

10. The non-transitory computer-readable medium of claim 9, wherein the performance measurements of connections made to one of the plurality of clients comprise client round trip time measurements.

11. The non-transitory computer-readable medium of claim 9, wherein spatially aggregating the representative series performance metrics comprises aggregating according to a requesting client IP address.

12. The non-transitory computer-readable medium of claim 9, wherein spatially aggregating the representative series performance metrics comprises aggregating into spatial clusters based on at least one of a subnet, a border gateway protocol prefix, an autonomous system path and an Internet service provider egress router level.

13. The non-transitory computer-readable medium of claim 9, wherein determining actual temporal bin metrics for each temporal bin comprises determining a median of the time series performance metrics in the temporal bin.

14. The non-transitory computer-readable medium of claim 9, wherein comparing an actual temporal bin metric of the temporal bin with the forecast temporal bin metric to detect the anomaly event further comprises using an enhanced Holt-Winters anomaly detection algorithm.

15. The non-transitory computer-readable medium of claim 10, wherein the round trip time measurements are separated from each other by at least 600 seconds.

16. The non-transitory computer-readable medium of claim 10, the method further comprising:

suppressing client round trip time measurements by using only a minimum round trip time measurement in each of a plurality of time windows.

* * * * *